United States Patent
Heiden et al.

(10) Patent No.: US 7,092,930 B2
(45) Date of Patent: Aug. 15, 2006

(54) ARCHITECTURE AND METHOD TO SECURE DATABASE RECORDS FROM TAMPERING IN DEVICES SUCH AS POSTAGE VALUE DISPENSING MECHANISMS

(75) Inventors: Richard W. Heiden, Shelton, CT (US); David K. Lee, Monroe, CT (US)

(73) Assignee: Pitney Bowes Inc., Stamford, CT (US)

( * ) Notice: Subject to any disclaimer, the term of this patent is extended or adjusted under 35 U.S.C. 154(b) by 505 days.

(21) Appl. No.: 10/113,258

(22) Filed: Mar. 28, 2002

(65) Prior Publication Data

US 2002/0161742 A1    Oct. 31, 2002

Related U.S. Application Data

(60) Provisional application No. 60/279,891, filed on Mar. 29, 2001.

(51) Int. Cl.
G06F 7/06 (2006.01)
H04L 1/00 (2006.01)
G06F 7/00 (2006.01)

(52) U.S. Cl. ............ 707/1; 707/9; 707/10; 705/60; 705/50; 705/51; 380/1; 380/232; 380/233; 380/255

(58) Field of Classification Search ........... 707/1–10, 707/104.1, 200–206; 380/24; 705/39, 405; 711/130, 9, 4
See application file for complete search history.

(56) References Cited

U.S. PATENT DOCUMENTS

| | | | | | |
|---|---|---|---|---|---|
| 4,253,158 | A | * | 2/1981 | McFiggans | 705/60 |
| 5,131,039 | A | * | 7/1992 | Chaum | 705/69 |
| 5,384,848 | A | * | 1/1995 | Kikuchi | 713/155 |
| 5,633,930 | A | * | 5/1997 | Davis et al. | 705/68 |
| 5,778,076 | A | * | 7/1998 | Kara et al. | 380/51 |
| 5,970,143 | A | * | 10/1999 | Schneier et al. | 713/181 |
| 6,199,055 | B1 | * | 3/2001 | Kara et al. | 705/405 |
| 6,253,193 | B1 | * | 6/2001 | Ginter et al. | 705/57 |
| 6,295,541 | B1 | * | 9/2001 | Bodnar et al. | 707/203 |
| 6,297,891 | B1 | * | 10/2001 | Kara | 358/405 |
| 6,449,622 | B1 | * | 9/2002 | LaRue et al. | 707/201 |
| 6,466,921 | B1 | * | 10/2002 | Cordery et al. | 705/60 |
| 6,671,813 | B1 | * | 12/2003 | Ananda | 713/202 |
| 6,889,214 | B1 | * | 5/2005 | Pagel et al. | 705/410 |
| 2001/0042052 | A1 | * | 11/2001 | Leon | 705/401 |

* cited by examiner

*Primary Examiner*—Sam Rimell
*Assistant Examiner*—Mellissa M. Chojnacki
(74) *Attorney, Agent, or Firm*—Eric P. Halber; Angelo N. Chaclas

(57) ABSTRACT

A method and apparatus for protecting against a replay attack in a database system makes use of customer records including a counter, and freshness records that include the customer counters and a freshness record counter. The counter from the customer records, the customer records in the freshness records, and the freshness record counter are used by a cryptographic device together with a cryptographic device counter to verify the freshness of the customer record prior to updating the customer record with respect to a recent transaction.

8 Claims, 3 Drawing Sheets

ARCHITECTURE AND METHOD TO SECURE DATABASE RECORDS FROM TAMPERING IN DEVICES SUCH AS POSTAGE VALUE DISPENSING MECHANISMS

CROSS REFERENCE TO RELATED APPLICATIONS

This application claims priority from U.S. Provisional Patent Application No. 60/279,891 filed on Mar. 29, 2001.

FIELD OF THE INVENTION

The present invention relates to secure management of information contained in a database and more particularly to a method and apparatus for securely storing and changing database records.

BACKGROUND OF THE INVENTION

The use of the Internet as a vehicle for communicating information and exchanging value electronically has resulted in the need for ensuring that such transactions take place in a secure manner. Not only is it imperative that the communication itself be secure but just as important is the need to ensure that information stored at a data center in a database be secured from tampering. For example, postage metering systems are now available whereby postage value in the form of an indicium can be obtained over the Internet. User accounts that are debited to pay for the downloaded postage are maintained in relational databases at a secure data center and are therefore secure from outsiders. However, there still exists the possibility that someone from within the data center could attempt to alter the postage account database records. The instant invention is directed to preventing such internal security attacks.

As discussed above, there are definite needs to secure the information stored in a database. In relational databases, data is stored as a database record. To protect the record, the confidential portion of a database record is encrypted, the record is digitally signed, and the signature is attached to the record. When it is required that information in a particular database record be changed, the manipulation of the database record is only performed in a cryptographic device(s) which holds cryptographic keys for encryption and which digitally signs the manipulated database record. There is also a need for a mechanism to protect against the 'replay' attack of a database record, i.e., an old but legitimate record is used to replace a newly updated record. Without such a replay protection mechanism, a cryptographic device cannot detect such an attack. This invention addresses the issue of replay attacks.

SUMMARY OF THE INVENTION

The instant invention provides an apparatus and method that provides for the secure management of database records. Furthermore, the instant invention protects against replay attacks by detecting such replay attacks as they occur.

DESCRIPTION OF THE DRAWINGS

The above and other objects and advantages of the present invention will be apparent upon consideration of the following detailed description, taken in conjunction with accompanying drawings, and in which like numerals used in the Figures refer to like components and.

DETAILED DESCRIPTION OF THE PRESENT INVENTION

Figure 1:
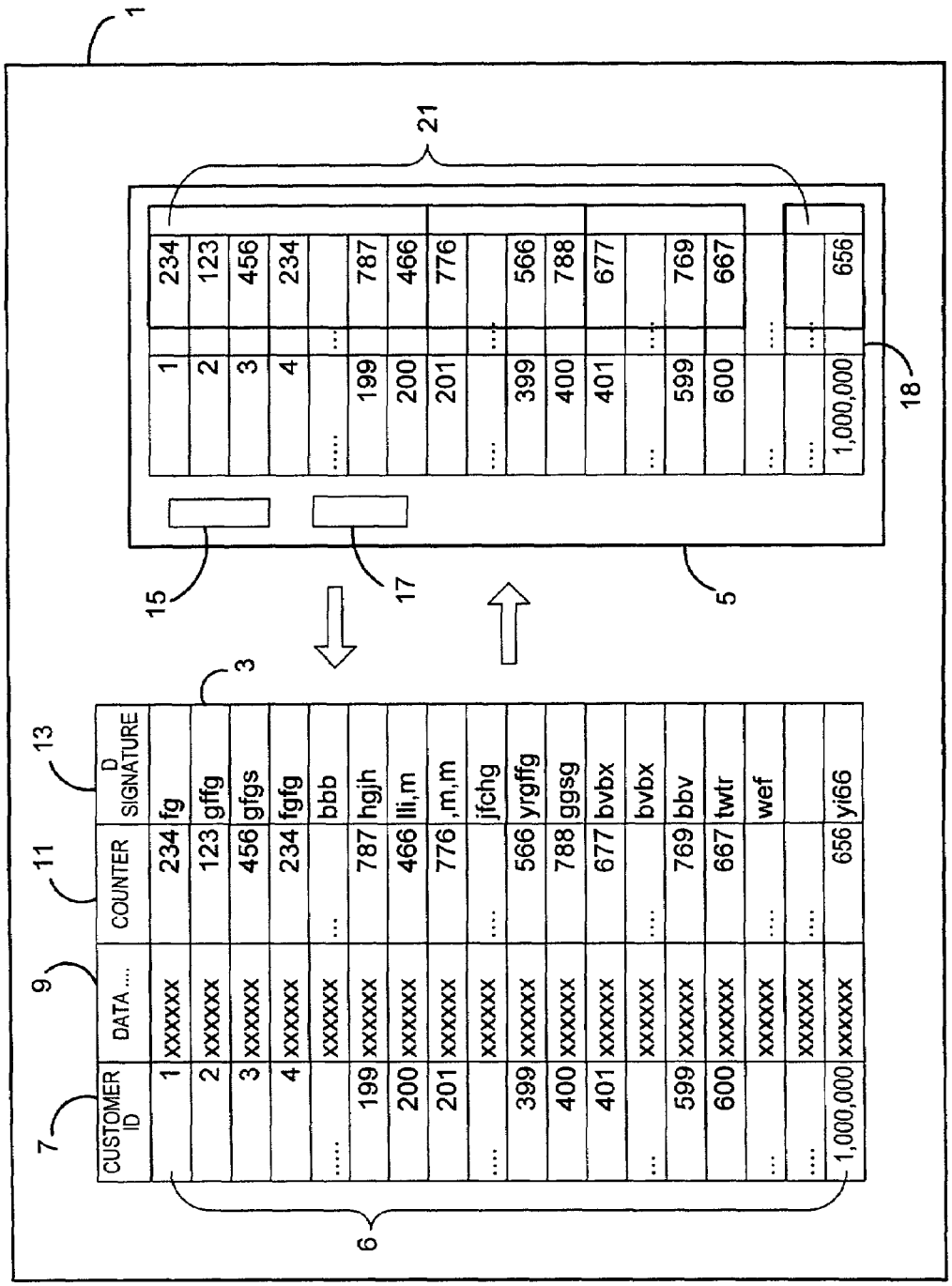
FIG. 1 is a block diagram of a first system for preventing a replay attack.

FIG. 1 shows a data center 1 including a customer database server 3 and a cryptographic device 5.

The customer database server 3 includes associated memory in which individual customer records 6 are stored. Each customer record includes a customer identification 7, data 9, a Freshness Counter 11, and a cryptographic signature 13 attached thereto. The cryptographic signature 13 is created by the cryptographic device 5 as discussed in more detail below.

The cryptographic device 5 is used to manipulate the data 9 of individual records 6 upon the receipt of an authenticated command. The cryptographic device 5 includes a processor 15 for manipulating the data 9 as well as for creating the digital signature 13 using stored algorithms and keys 17. The cryptographic device 5 in another embodiment can also encrypt the data 9 for additional record security purposes. The cryptographic device 5 also includes non-volatile memory (NVM) 18 in which Freshness Counters 21 are stored. Each freshness Counter 21 corresponds on a one to one basis with one of the Freshness Counters 11 in the customer records 6. Each of the aforementioned Freshness Counters 11 and 21 are updated each time the associated individual customer record 6 is manipulated by the cryptographic device 5. The counter used in one embodiment is simply an incremental counter that goes up by one for each record transaction performed by the cryptographic device. However, the freshness data used can be any other data that is unique to the individual transaction such as a randomly generated number, a time stamp, or other nonce.

The creation of individual customer records 6 is as follows. An authenticated command is sent to and instructs the cryptographic device 5 to create a customer record 6 (e.g. customer ID 1) having an associated Freshness Counter 11 initialized to 0. The customer record 6 may be digitally encrypted and/or signed by the cryptographic device 5 with the cryptographic signature 13 appended thereto. The newly created record 6 is stored at the customer database server 3. At this time, the cryptographic device 5 also initializes (sets to 0) the corresponding freshness counter 21 in its NVM 18.

When a customer database record 6 has to be updated (because a transaction has occurred relative to that customer record 6), the customer record 6 is sent to and received by the cryptographic device 5. The cryptographic device 5 checks the authenticity of the cryptographic signature 13, and decrypts the contents of the record 6 if encrypted. If the authentication of the digital signature 13 (and any required decryption) is successful, then the cryptographic device 5 compares the Freshness Counter 11 obtained from the customer record 6 against the corresponding Freshness Counter 21. If the Freshness Counter values 11 and 21 match, the cryptographic device 5 updates the individual customer record 6 as requested and increments the Freshness Counters 11 and 21. The updated customer record 6 is then signed by the cryptographic device 5 and the updated customer record 6 with the new digital signature 13 appended thereto is stored at the customer database server 3 as an updated customer record 6.

The above procedure solves the replay problem discussed in the background. That is, if an old customer record is sent to the cryptographic device 5 instead of a current updated customer record 6, the old customer record's cryptographic signature 13 will be authenticated by the cryptographic device 5. However, the Freshness Counter 21 and corresponding Freshness Counter 11 obtained from the old customer record will not match thereby providing evidence of a replay attack and allowing appropriate action to be taken by the proper authorities.

While the implementation described above is effective and is simple, its usefulness is limited by the size of the non-volatile memory 18 of the cryptographic device 5. As an example, suppose that one Freshness Counter 21 is 4 bytes long (the counter value ranges from 0 to 4294967295). To support a million records, the size of non-volatile memory 18 should be as large as 4 mega bytes, which exceeds the capacity of a commercially available cryptographic device 5. Additionally, for security purposes, the Freshness Counter 21 should not overflow. If it reaches the maximum value, further transactions on such a record must be prohibited.

Figure 2:
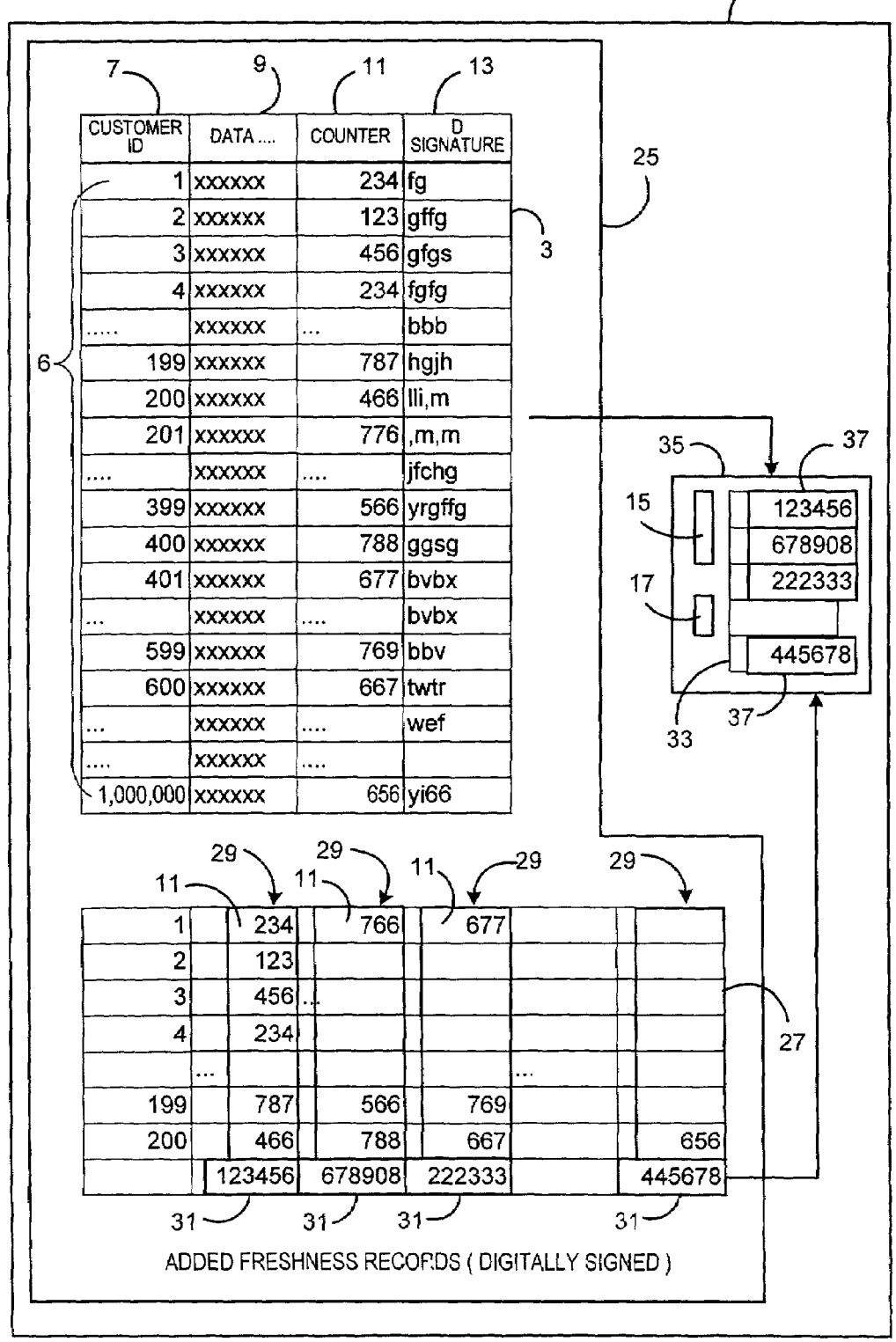
FIG. 2 is a block diagram of a second system for preventing a replay attack.

FIG. 2 shows another embodiment of the invention which overcomes the current limitation in the available size of the NVM in cryptographic devices. A data center 23 includes a database server 25 which has stored in associated memory individual customer records 6 as well as a freshness record database 27. Each column (referred herein as a freshness record) 29 of the freshness record database 27 includes 200 individual freshness counters 11 and an associated total freshness counter 31 that represents the sum of all of the freshness counters 11 of the column 29. The value in the freshness counters 31 is stored both in the freshness record database 27 and in an NVM 33 of a cryptographic device 35 as freshness counters 37. Each freshness record 29 is digitally signed by the cryptographic device 35 as discussed further below. The size of freshness counters 31 and 37 of FIG. 2 should be much larger than that of freshness counters 11 (and of freshness counter 21 of FIG. 1) (in this example, freshness counters 31 and 37 must be 200 times larger). However, the size requirement of the non-volatile memory 33 of the cryptographic device 35 is effectively reduced to 200 times smaller than the non-volatile memory size requirement of the memory 18 of cryptographic device 5 of FIG. 1 since a counter for each customer record 6 is no longer stored in the non-volatile memory 33 of the cryptographic device 35.

In the FIG. 2 embodiment, the freshness of a customer database record 6 is verified as follows.

1. Both a customer database record 6 and an associated freshness record 29 (i.e. customer ID 1 and the freshness record 29 including ID 1) are provided to the cryptographic device 35.
2. The cryptographic device 35 checks the digital signature of both records 6, 29 to verify that they are authentic.
3. The cryptographic device 35 then compares the value in the freshness counter 31 extracted from the freshness record 29 with the corresponding value in the freshness counter 37 of its own non-volatile memory 33. If these counter values match, the cryptographic device 35 extracts the freshness counter 11 from the freshness record 29.
4. The cryptographic device 35 then compares the extracted freshness counter 11 from the freshness record 29 against the freshness counter 11 of the customer database record 6. If they match, the freshness of the database record 6 is verified.

Once the above verification has occurred, the cryptographic device 35 performs the requested transaction and manipulates the data 9 in the customer record 6 to reflect the transaction (for example if the data 9 represented postage meter accounts, the accounting records would be updated to reflect a transaction where postage was dispensed). Once the transaction is completed, the cryptographic device 35 updates the freshness counter 11 in the customer data base record 6, the freshness counters 11 and 31 in the freshness record 29, and the corresponding freshness counter 37. The cryptographic device 5 also appends a new cryptographic signature 13 to the customer record 6, cryptographically signs the freshness record 29, and sends the updated records 6 and 29 back to the database server 25 for storage.

While the above discussion of FIG. 2 shows the instant invention implemented using only a single cryptographic device 5, large-scale systems may require the use of many cryptographic devices in order to support the ability to determine the freshness of a large number of customer database records.

Figure 4:
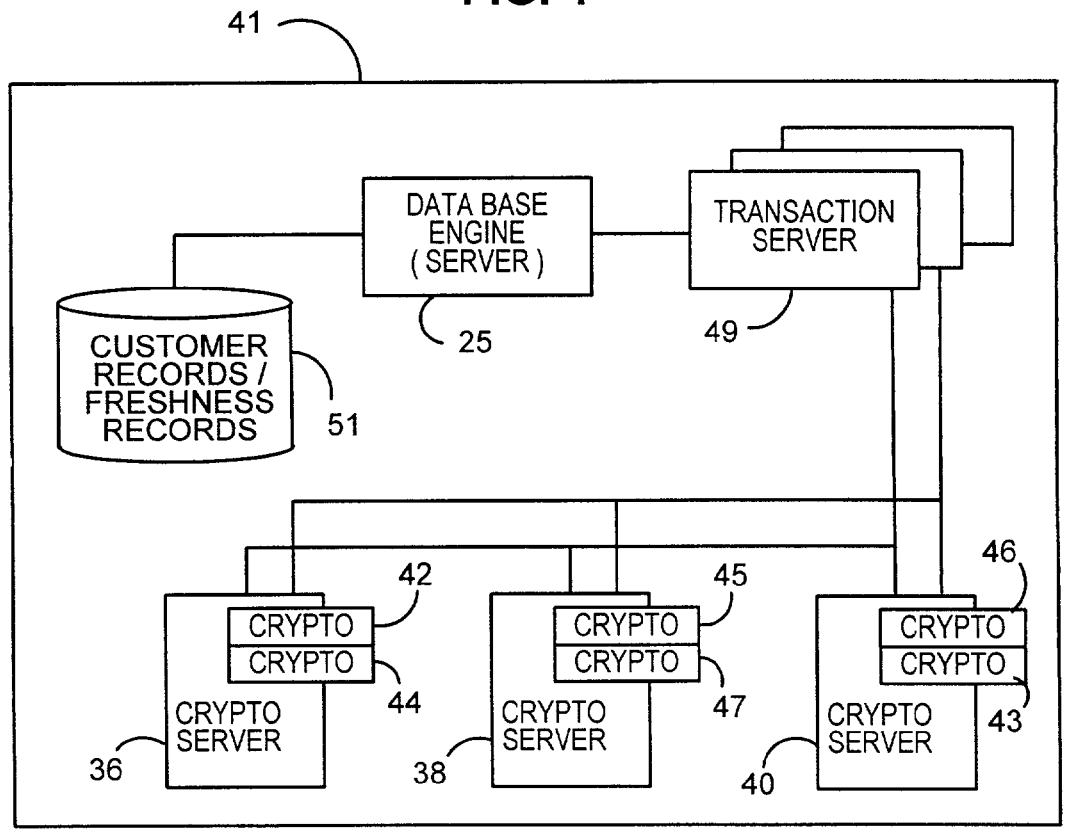
FIG. 4 shows a large-scale implementation of an inventive system including multiple cryptographic devices and having freshness redundancy capability.

FIG. 4 shows a secure transaction system 41, which uses a plurality of the cryptographic servers 36, 38, 40 [(and associated cryptographic devices (42, 43, 44, 45, 46, and 47)] and the replay prevention mechanism shown in FIG. 2. The secure transaction system 41 also includes a database server 25, multiple transaction servers 49, and a customer database 51 including all customer records 6 and freshness records 29. An example of a cryptographic device would be the cryptographic device from IBM model number 4758.

The transaction servers 49 execute a transaction request from a customer. The transaction servers 49 also serve as a communication relay from one cryptographic device to another cryptographic device. For each even numbered cryptographic device (42, 44, 46) there is a corresponding odd numbered cryptographic device (43, 45, 47). Each of the corresponding odd and even cryptographic devices hold an identical set of freshness counters 37 for redundancy purposes. The arrangement of the cryptographic devices to their corresponding cryptographic server is such that even if one cryptographic server is out of service, the transaction system 41 still functions. In FIG. 4, there is no single point of failure because: (1) there are multiple transaction servers 49, (2) a pair of cryptographic devices share identical freshness counters 37, and (3) each of the cryptographic devices of a pair of corresponding cryptographic devices is housed in a different cryptographic server. Each of the cryptographic devices 42,43,44,45,46, and 47 has at least the same functionally as the cryptographic device 37.

The processing of a transaction makes use of the multi-threading capability of the cryptographic devices, i.e. the capability to process a transaction as well as to verify the freshness of the customer record 6. Thus, in FIG. 4, the transaction servers 49 can request that a transaction occur at any one of the cryptographic devices 42, 43, 44, 45, 46,47.

Figure 3:
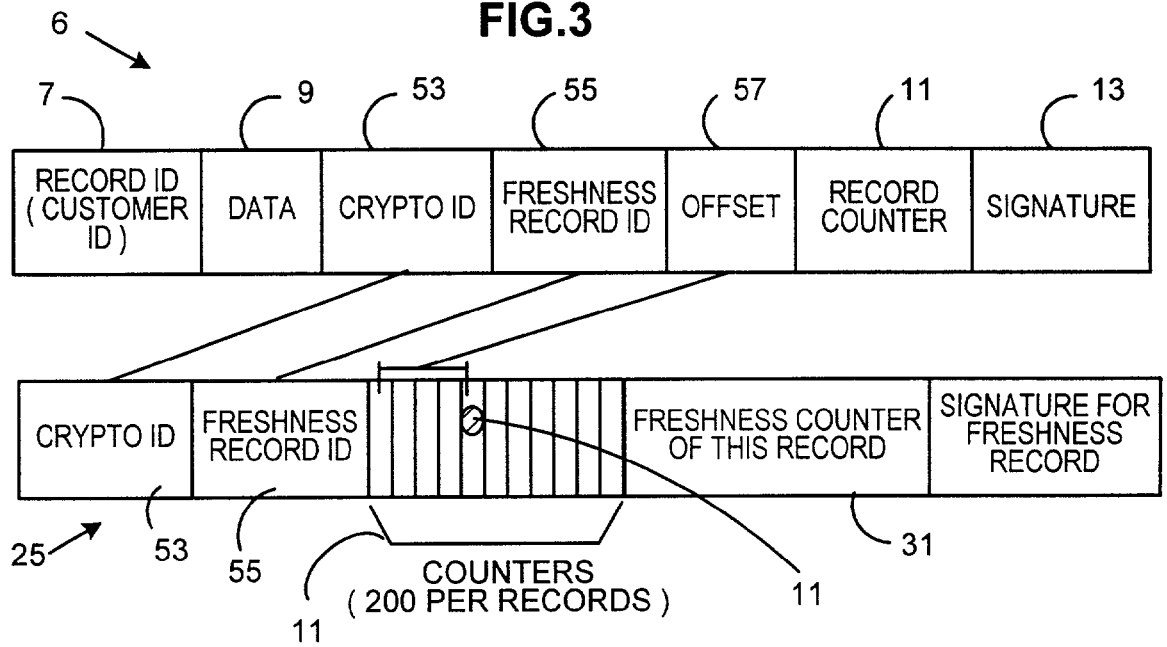
FIG. 3 is a diagram showing the structure of customer and freshness records.

FIG. 3 shows the inventive record structure for a customer database record 6 as well as for freshness records 29 that are stored in the database 51 of FIG. 4 in order to permit the operation of the system 41. The customer database record 6 has all the data required to locate the individual freshness counters 11 in the freshness record 29, i.e. the cryptographic device ID 53, the freshness record ID 55, and the offset 57 of the freshness record 29. A freshness record 29 consists of the cryptographic device ID 53, the freshness record ID 55, individual freshness counters 11, and the total freshness counter 31. In the large-scale system 1, a particular cryptographic device holds the freshness counters 37 for a pre-defined set of customer database records 6. The customer records 6 in the database 51 are used to perform transactions. Examples of such transactions are those that are conducted in an Internet Postage system (CSO). The postal funds in a customer record 6 can be deducted when the proof of postage is delivered to a customer. Performing the accounting transaction on the data 9 of the customer record 6 can be executed in any one of the cryptographic devices of FIG. 4 while the verification of the freshness of the customer record 6 can be delegated to a different one of the cryptographic devices in the network of cryptographic devices of FIG. 4 that has the corresponding freshness counter 37 stored therein. Further, an individual cryptographic device also may fail. Accordingly, for reliability, and as stated above, two cryptographic devices hold identical data freshness counters 31 associated with specific customer records 6.

The operation of system 41 is as follows:

1. A transaction server 49 receives a customer record 6 from the customer record database 51 via the database server 25, and sends it to any available cryptographic device (42, 43, 44, 45, 46, 47), which is identified as a CRYPTOxaction device for the purpose of the instant transaction. The CRYPTOxaction device then verifies the digital signature 13 of the customer record 6, and extracts the cryptographic ID 53, freshness record ID 55, freshness counter 11 and offset 57 therefrom. The CRYPTOxaction device then issues a request (which includes the extracted data) to verify the freshness of the customer record 6 to the transaction server 49.

2. The transaction server 49 gets the freshness record 29 identified in the customer record 6 by the freshness record ID 55 from the database server 25. Both the freshness record 29 and the request from the CRYPTOxaction device are sent by the transaction server 49 to the cryptographic device identified by the cryptographic ID 53 as well as the matching redundant back-up cryptographic device. Both of the identified matching cryptographic devices independently verify the freshness of the customer data record 6 in accordance with the procedure discussed above in connection with FIG. 2. The two matching cryptographic devices (one even, one odd) update the freshness record 29 and the freshness counter 37 and provide the updated freshness record 29 to the transaction server 49 together with a freshness verification message. If either verification fails, the transaction will not be authorized and the system can be alerted to the discrepancy.

3. Assuming a successful verification has occurred, the transaction server 49 delivers the verification message to the CRYPTOxaction device. If verification has occurred, the CRYPTOxaction device updates the data 9 of the customer record 6 to reflect the performed transaction, updates the counter 11 in the customer record 6, attaches the new digital signature 13 and sends the updated customer record 6 to the transaction server 49.

4. The transaction server 49 updates both the customer database record 6 and the freshness record 29 in the database 51 via the database server 25.

Note that all communications between any two cryptographic devices are digitally signed, and also utilize a challenge-response type mechanism to prevent a replay attack ("A" sends a digitally signed message with a random number to "B". "B" increments the random number. "A" verifies the increment.)

Fail-over to another site:

The system 41 of cryptographic devices has redundancy to eliminate a single point of failure as described above. That is, (1) if one cryptographic device of a pair fails, then the other cryptographic device of the pair provides all functions. (2) If a PC fails, another PC provides the functions. However, in the data processing industry, the fail-over operation can be prepared for disaster recovery (e.g. blackout or earthquake). For example, if one site in Los Angeles fails, then another site in New York should take over the operation.

The backup site (Site B) has the exact system configuration as the main site (Site A—which has the FIG. 4 configuration). The database of Site A is replicated to the database of Site B as transactions are executed. An example of an industry practice to replicate a database to another site is to send a transaction log to Site B at a predetermined time interval, rather than in real time to enhance the system performance. Due to this replication operation, the freshness counters 37 of the cryptographic devices of Site B should be updated as well. However, if they have to be updated in real time, then the performance of the system will be severely impacted. This invention solves this problem as follows.

As part of the replication process, the freshness records 29 of database of Site A are replicated to Site B. The system of Site B is mostly idle, not involved in a real time transaction. In Site B, the main processor monitors any update of the freshness records 29. If an update is detected, then it sends a command which instructs the appropriate cryptographic device processor to update the freshness counter 37 by supplying the freshness record 29 from the database 51. The idea here is that the freshness counter 37 of the cryptographic device is updated if the freshness counter 31 value of the freshness record 29 is newer than that of the cryptographic device. Of course, the digital signature of the record is verified all the time. In this fashion, the freshness counters 37 of the cryptographic devices of the backup site (Site B) is updated continuously, without serious impact on system performance.

The system of FIG. 4 expands the effective size of the nonvolatile memory of the cryptographic device by constructing a network of cryptographic devices and also by utilizing the customer record database 51 for storing the freshness records 29 thereby minimizing the data storage requirements of the cryptographic device non-volatile memory 33.

The contents of U.S. Provisional Application No. 60/279891 filed on Mar. 29, 2001 is hereby incorporated by reference.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims.

What is claimed is:

1. A method for ensuring the freshness of records in a system comprising the steps of:

storing a plurality of customer records, each customer record including a counter indicative of the transaction status of the customer record;

storing a plurality of freshness records, each freshness record including at least a subset of the total number of counters for all of the customer records and also including a freshness record counter that is related to the subset of the total number of counters in the freshness record;

storing in a cryptographic device separate from the customer and freshness records a cryptographic device counter initially set to be consistent with an initial value in the freshness record counter;

upon a request to update a specific customer record, identifying the freshness record that includes the counter associated with the specific customer record and sending the freshness record and the specific customer record to the cryptographic device;

extracting at the cryptographic device from the freshness record the freshness record counter;

determining if a first predetermined relationship exists between the extracted freshness record counter and the cryptographic device counter; and if the first predetermined relationship exists, extracting the counter associated with the specific customer record from the customer record and comparing it to the counter associated with the specific customer record stored in the freshness record to determine if a second predetermined relationship exists; and if the second predetermined relationship exists, permitting the specific customer record to be updated.

2. A method as set forth in claim 1, further comprising cryptographically securing the freshness records.

3. A method as recited in claim 2, further comprising digitally signing the freshness records.

4. A method as recited in claim 1, further comprising cryptographically securing the customer records.

5. A method as recited in claim 4, further comprising attaching a digital signature to each of the customer records.

6. A method as recited in claim 1, further comprising subsequent to determining that the first and second predetermined relationships exist, using the cryptographic device to update the counter in the specific customer record, to update in the freshness record sent to the cryptographic device by updating the counter in the freshness record sent to the cryptographic device corresponding to the counter in the specific customer record and updating the freshness record counter of the freshness record sent to the cryptographic device, and to update the cryptographic device counter.

7. A method as recited in claim 1 wherein the counter indicative of the transaction status reflects a numerical value and the freshness record counter is the sum of the numerical values of the subset of the total number of counters in the freshness record.

8. A system comprising:

a database including a plurality of customer records, each customer record including a counter indicative of the transaction status of the customer record and a plurality of freshness records, each freshness record including at least a subset of the total number of counters for all of the customer records and also including a freshness record counter that is related to the subset of the total number of counters in the freshness record;

a cryptographic device, separate from the database, including a cryptographic device counter initially set to be consistent with an initial value in the freshness record counter; and means, upon a receiving a request to update a specific customer record, for identifying the freshness record that includes the counter associated with the specific customer record and sending the freshness record and the specific customer record to the cryptographic device;

wherein the cryptographic device extracts from the freshness record the freshness record counter, determines if a first predetermined relationship exists between the extracted freshness record counter and the cryptographic device counter; if the first predetermined relationship exists extracts the counter associated with the specific customer record from the customer record and compares it to the counter associated with the specific customer record stored in the freshness record to determine if a second predetermined relationship exists; and if the second predetermined relationship exists initiates the update of the specific customer record.

* * * * *